Aug. 18, 1970     R. W. DAM ET AL     3,524,252
METHOD OF ULTRASONICALLY TREATING FERRITE CORES
Filed Aug. 5, 1968     2 Sheets-Sheet 1

INVENTORS
REYNIER W. DAM
BELA GOGOS

BY Robert Lieber

ATTORNEY

United States Patent Office

3,524,252
Patented Aug. 18, 1970

---

3,524,252
METHOD OF ULTRASONICALLY TREATING FERRITE CORES
Reynier W. Dam, Rhinebeck, and Bela Gogos, Wappingers Falls, N.Y., assignors to International Business Machines Corporation, Armonk, N.Y., a corporation of New York
Filed Aug. 5, 1968, Ser. No. 750,321
Int. Cl. H01f 7/06
U.S. Cl. 29—604    10 Claims

---

ABSTRACT OF THE DISCLOSURE

In the process of manufacture of large batches of linear ferrite cores for pulse transformation applications (e.g. read only storage in computers) a step of mass ultrasonic vibration of entire batches is introduced. Nickel-zinc ferrite cores, sintered in batches on the order of 50,000 cores, are also vibrated in batches for a selected period of time determined by a measured average signal response characteristic of a sampling of cores selected at random from the batch. The sintering process is controlled to produce a higher than desired batch average response amplitude before the vibration is applied. For the vibration step the batch of cores is immersed in a solution of alcohol containing a suspension of fine abrasive $Al_2O_3$ particles. The suspension with the cores is placed in the tank of an ultrasonic vibrator and vibrated for a predetermined selected period of time. The cores produced by this process have linear characteristics approaching those of a nearly perfect inductor and a reduced amplitude of response. The B–H loop is constricted, losses are reduced, and magnetostrictive ringing is lessened. These characteristics are controllable and remain stable and constant over a broad temperature range.

BACKGROUND OF THE INVENTION

Field of the invention

Linear ferrities, particularly in the shape of cores, are widely employed as inductive impedance elements in computers and in electronic equipment generally. Linear ferrites should be distinguished in this context from square-loop ferrites which are widely employed as bistable storage elements in computers. Linear ferrite cores have B–H loop characteristics approaching a straight line, and ideally present purely inductive impedance to pulses transferred between drive and sense conductors linked to the cores. In contrast square-loop ferrite cores have expanded B–H hysteresis loop characteristics, which ideally approach the shape of a rectangle or square, and tend to change their conditions of remanent magnetization discretely when subjected to drive pulses of sufficient amplitude.

Today ferrite cores having small diameters are mass produced by pressing a powdered composition of ferrite with an organic binder into core shapes, and thereafter sintering the pressed material at a high temperature. Millions of tiny cores may be produced from a single powder preparation. After pressing, the cores are sintered in batches containing on the order of 50,000 cores. The present invention is concerned with improving certain qualities of linear cores produced in this fashion, in a batch treatment commensurate with the batch handling of the cores in the sintering process. It is understood that sintering represents a critical step in the forming of the magnetic properties of the cores.

We have discovered that controlled abrasive vibration of linear ferrite cores tends to reduce the amplitude of responsive and can be used to improve the core properties of linearity, temperature stability and magnetostrictive ringing. When applied in one mass treatment to each batch of cores produced in one sintering, in a predetermined manner for a predetermined time, such vibration tends to improve the properties of the cores within the batch and to make such improvement in properties more uniform and predictable from batch to batch.

Description of the prior art

As indicated in the patent to Lufcy et al. 2,999,215 granted Sept. 5, 1961 it is known that certain physical properties of tape-wound cores may be made more stable and uniform by subjecting the cores to physical vibration of a controlled nature. However, the process described in this patent is not readily adaptable to batch treatment of pressed and sintered ferrite cores and is not directed specifically to improving properties of linearity and temperature stability of such cores. Where the present invention utilizes a predetermined function of the average signal response of a tested sample group of cores in each sintered batch to determine a duration of mass application of abrasive vibrations to the batch, Lufcy et al. contemplate applying predetermined vibrations to all cores, singly or in small groups, irrespecetive of the manufacturing process and without direct correlation of vibration time to signal response.

As disclosed in the Lufcy patent internal stresses set up in the cores during manufacture are relieved by the shaking rod which applies direct forces to the inner surface lining the hole of each core, whereas in the present method stresses are applied rapidly and uniformly to the cores through collisions, at ultrasonic frequencies, of cores with each other and with the smaller abrasive particles in the alcohol suspension medium in which the cores are batch agitated.

Lufcy et al. contemplate virtually any frequency of vibration whereas the present invention has been observed to be most effective in the ultrasonic range and practically unnoticeable in effect after vibrations at low audio frequencies.

Lufcy et al. were concerned only with improving the shock-resistant qualities of tape wound cores whereas the present invention seeks to improve the linearity and temperature stability of the magnetic properties of pressed and sintered ferrite cores.

SUMMARY OF THE INVENTION

As heretofore stated the surprising discovery of the present invention is that sintered ferrite cores with linear response characteristics, when and only when ultrasonically stressed in a particular manner, tend to exhibit desired changes in magnetic properties in regard to enhanced linearity, lessened magnetostrictive ringing, and greater response temperature stability over a broad temperature range. This improvement is accompanied by a reduction in amplitude of response. It has been discovered further that when the extent of abrasive agitation is related to average peak amplitude of response of batches of commonly fired cores, based on tests of a small random sampling of cores taken from each batch prior to agitation of the batch, the cores when treated in a batch will exhibit more uniform signal response properties from batch to batch. The process of treatment extends over a span of minutes which is sufficiently long to permit complete control of the treatment. Changes in any small interval of the treatment period are extremely small.

Accordingly it is a primary object of this invention to provide a process of treating linear ferrite cores made from a pressed and sintered ferrite powder composition to improve the linearity properties of such cores.

Another object is to provide a process of batch treating a large batch of linear ferrite cores produced from a common preparation of powdered ferrite to improve generally the properties of linearity and temperature stability of all cores in the batch.

Another object is to provide a process for batch treating linear ferrite cores having a common origin of manufacture to improve the signal response properties of linearity, uniformity, temperature stability, and magnetostrictive ringing, for the entire batch in a highly controllable manner.

Another object of this invention is to provide a process for mass treating linear ferrite cores sintered in batches, to obtain improved signal response characteristics generally for the batch, which is commercially feasible as a treatment and which is correlated with a signal response property of a pre-tested random sampling of cores in each batch, in order to assure uniformity of batch response after treatment.

The foregoing and other objects, features and advantages of the invention will be apparent from the following more particular description of a preferred embodiment of the invention with reference to the accompanying drawings.

DETAILED DESCRIPTION OF A PREFERRED EMBODIMENT

Figure 1:
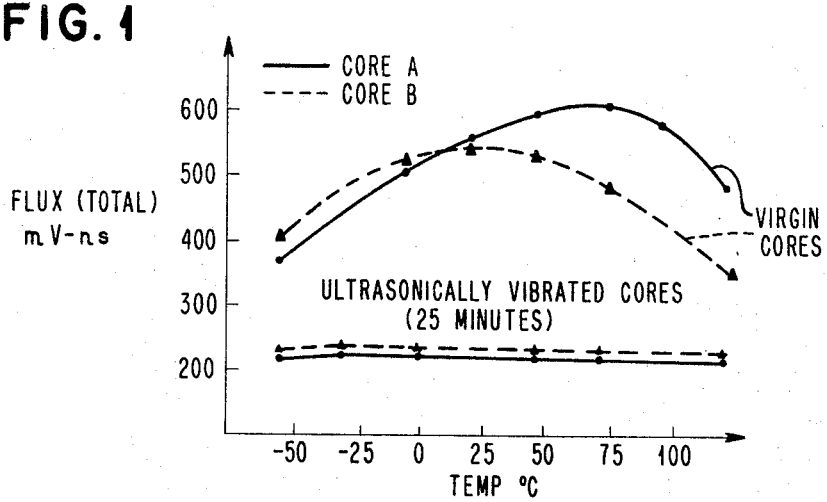
FIG. 1 is a graph illustrating total induced flux vs. temperature for untreated (virgin) and treated (ultrasonically vibrated) linear ferrite cores in response to a predetermined drive signal.

A batch of linear ferrite cores to be treated en masse in accordance with the teachings of the present invention may be formed from a single common preparation of nickel-zinc ferrite powder. The invention contemplates batch sintering and treatment of a batch size on the order of 50,000 cores.

The cores to be treated are of linear type. They are used as inductive coupling elements (e.g. in read only memory systems) rather than storage elements. This means that even prior to treatment the cores should exhibit constricted B–H loop characteristics. A batch of such cores may be produced from a single powdered preparation of nickel-zinc ferrite powder, through a pressing drying and sintering process.

We have obtained suitable batches of approximately 50,000 cores of small size (7.5 mils I.D., 12.5 mils O.D.) by milling together for six hours, in an eight gallon steel ball mill containing a 50 percent by volume charge of steel balls (between 0.25 and 0.50 inch in diameter), a mixture of 4,500 grams iron oxide ($Fe_2O_3$), 1,540 grams of zinc oxide (ZnO), and 1,200 grams of nickel carbonate ($NiCo_3$), suspended in 17 liters of distilled water. We screen the resulting slurry with a 400 mesh screen and vacuum filter, dry the filtered remnant in an oven at 110° C., and calcine the dried powder for two hours at 800° C.; allowing eight hours to attain calcining temperature and another eight hours to cool the calcined product to room temperature. We then grind the calcined product in a ball mill as above using two liters of distalled water per kilogram of ferrite and again screen and filter to yield a powder which is dried in an oven at 110° C. This latest powder is mixed in a solution of four percent by weight of an organic binder (polyvinyl alcohol), one percent by weight of a lubricant (dibutyl phtalate) and water to form a slurry. The slurry is dried, until it contains twelve percent moisture, then granulated and then dried further for a period of 10 to 15 hours at 70° C. The granulate is screened through a 60 micron sieve on a 45 micron screen and pressed in core shaped molds to an average density of 3.5 gr./cm.$^3$. The cores thus obtained are heated to 600° C. at a rate of 100° C. per hour, remain at 600° C. for one hour, then cooled to room temperature at a rate of 100° C. per hour. The millions of cores obtained in this manner are sintered in batches on the order of 50,000 cores in a furnace maintained at a temperature of 1115° C. for 16 hours. The pressed and sintered core products, upon being quenched to room temperature, are prepared for the batch stressing treatment which is the subject of the present invention and which is described next. These cores have the approximate composition: 49 mol percent $Fe_2O_3$, 18 mol percent NiO, and 33 mol percent ZnO.

The abrasive vibrational treatment of the present invention is applied en masse to each batch of 50,000 cores, produced by the foregoing method as follows:

(1) A sample group of 35 cores selected at random from the batch is subjected to an electrical test to measure the average of the peak amplitudes $Vr$ in the induced voltages obtained for the group in response to a predetermined drive current pulse. In this test each core is placed on a conventional test probe known to the art which provides isolated drive and sense line couplings to the core. A current pulse of predetermined form is applied to the drive line coupling and the amplitude of the sense line voltage response is noted.

(2) The cores of each batch, when sintered as above, have an average $Vr$ on the order of 15 millivolts. Using the empiricaly derived curve of FIG. 8, a time of vibration is determined. This curve represents the relationship between average amplitude of $Vr$ of the batch, and the time of ultrasonic abrasive vibration needed to reduce the $Vr$ of the batch to the range 7.4–10.0 mv. It should be noted that this range represents a typical applicational range. It should be understood that for a different application a different range might be more suitable. The important point to note in this regard is that the sintering process and vibration treatment are coordinated so that the decrease in $Vr$ associated with vibration tends establish a desired $Vr$ for each batch. Thus, a batch of cores having a sample group average $Vr$ response of 12 millivolts would receive only 44 minutes of abrasive agitation by the subject method to decrease the batch $Vr$ to 7.4–10.0 millivolts with the desired improvement in other properties as above, while a batch with a group average $Vr$ response of 16 millivolts would require 104 minutes of agitation by the same method to have an average batch $Vr$ of 7.4–10 millivolt with slightly better improvement in the above mentioned other properties.

Figure 8:
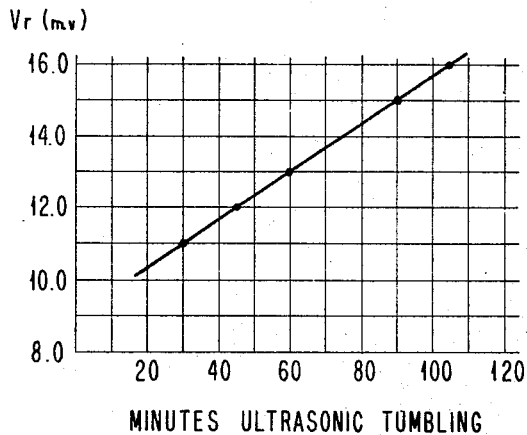
FIG. 8 is a graph illustrating the empirically determined relationship which correlates average batch (peak) voltage response in millivolts with ultrasonic abrasive vibration time of batch treatment in minutes.
Figure 9:
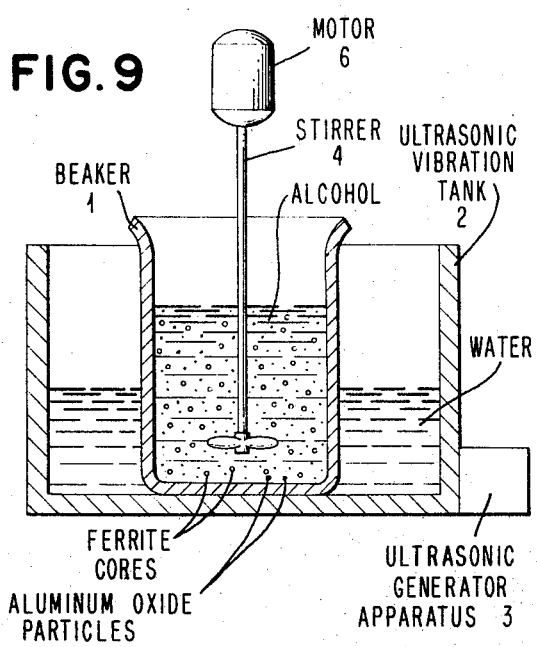
FIG. 9 is a drawing of the apparatus for applying the inventive treatment hereof to the cores.

(3) Referring to FIG. 9 the method of agitation associated with the particular response agitation time relationship detailed in FIG. 8 involves ultrasonic vibration of the cores in a batch suspended in a beaker 1 containing a solution of alcohol and fine abrasive particles of aluminum oxide, $Al_2O_3$. In this medium the cores inter-act abrasively with each other and with the $Al_2O_3$ particles to provide the desired stresses which are believed to cause the resulting improvement in linearity of response, magnetostrictive ringing effects, and temperature stability. The beaker with cores in suspension is placed in water in an ultrasonic vibration tank 2. The beaker and tank, seen in section, are vibrated by ultrasonic generator 3 at a frequency of 40 kilocycles for the time T determined from a sample group of cores taken at random from the batch using the curve of FIG. 8. During this interval T a stirrer 4, with its blade 5 extending into the liquid in beaker 1, is rotated at a constant speed of 150 r.p.m. by motor 6. This maintains the cores and $Al_2O_3$ particles uniformly distributed in the alcohol. Details of the materials and means employed in the foregoing abrasive vibration treatment are:

Ultrasonic generator—Acoustical Model DH125AH (fixed vibration frequency of 40 kc.) with tune control set at 63% point to control vibration amplitude.

Vibration tank—Acoustica Model T2-4, 2 gallon capacity; filled with 550 milliliters of water for subject treatment.

Beaker—250 milliliter capacity. In subject treatment it is loaded with 100 milliliters alcohol, 50,000 cores, and 7.5 grams aluminum oxide in a fine powder.

Stirrer—laboratory stirrer with stand and conventional motor linkage.

(4) After treatment the cores are transferred from the beaker 1 to a drying screen using magnetic means such as magnetic tweezers.

(5) Air is blown over the cores and through the screen to dry the cores and remove all traces of aluminum oxide.

(6) A new random sampling of 35 cores is tested for voltage response Vr to a given excitation and for flux change induced by such excitation over the temperature range −50 to +105° C. Response will now lie in the range 7.5 to 10.0 millivolts, and induced flux changes will be somewhat lowered and constant over the entire temperature range, if the cores are not defective.

FIG. 1 shows that induced flux changes, in millivolts-nanoseconds, of a random sampling of two untreated cores (core A and core B), in response to a current pulse, will vary widely over the temperature range −50 to +105° C., whereas a like sampling of treated cores ultrasonically vibrated by the above method for 25 minutes exhibits constant lower induced flux over the same temperature range.

Figure 2:
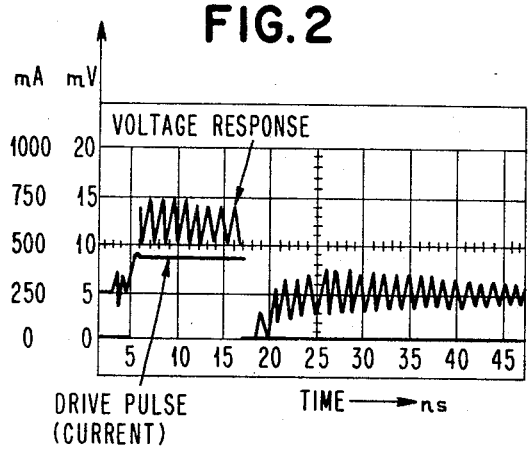
FIG. 2 is a graph illustrating magnetostrictive ringing in the induced voltage response of untreated cores to a drive current pulse also illustrated. The horizontal scale is 500 manoseconds per unit division and the vertical scale is 5 millivolts per unit division for voltage response and 250 milliamperes per unit division for drive current input.
Figure 3:
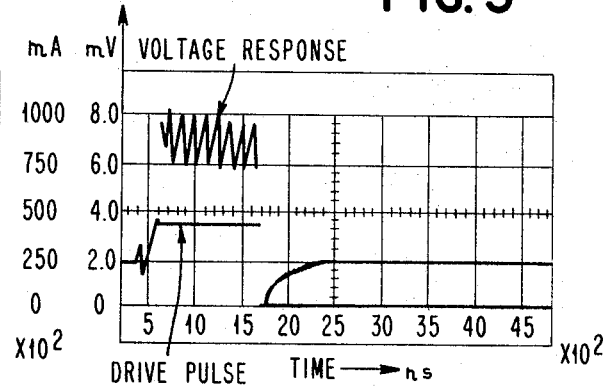
FIG. 3 is a graph illustrating magnetostrictive ringing in the induced voltage response of ultrasonically vibrated (treated) cores. The scales for drive current and time are the same as in FIG. 2. The vertical scale for voltage response is 2 millivolts per unit division.

FIGS. 2 and 3 respectively illustrate magnetostrictive ringing of untreated and treated cores. The combined responses of ten cores shown were obtained by photographs of oscilloscope display patterns. The horizontal scale in both figures is 500 nanoseconds per unit division. The vertical voltage scale is 5 millivolts per unit division in FIG. 2 and 2 millivolts per division in FIG. 3. The drive current is 200 milliamperes per unit division in both figures. FIG. 3 reveals that the ultrasonically vibrated cores show very little magnetostrictive ringing effect after fall time of the applied pulse, and lessened magnetostrictive ringing during the applied pulse in comparison to the response of untreated cores (FIG. 2).

Figure 4:
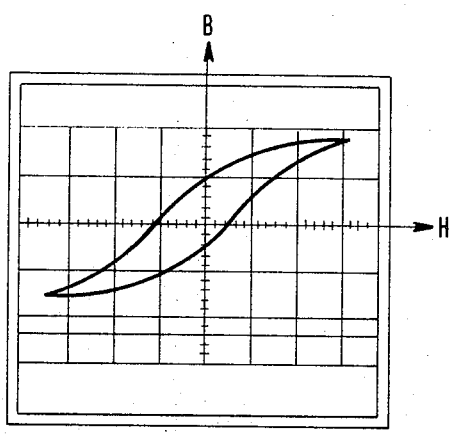
FIG. 4 illustrates the B–H loop of a typical untreated "linear" ferrite core.
Figure 5:
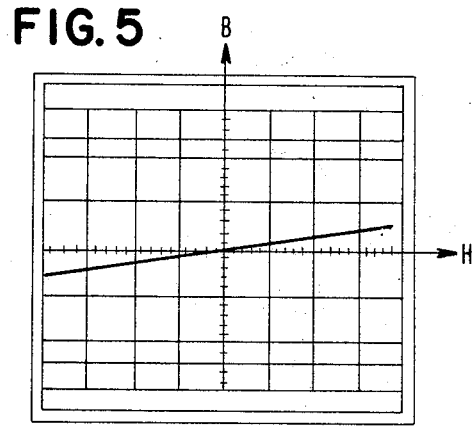
FIG. 5 illustrates the constricted (linear) B–H "loop" of a typical linear ferrite core after 60 minutes of ultrasonic abrasive vibration (treatment) according to the method of the present invention.

FIGS. 4 and 5 respectively indicate observed B–H loop characteristics (drawn from oscilloscope photographs) and after vibrational treatment of a single core for one hour in an alcohol-$Al_2O_3$ suspension. Before vibration (FIG. 4) the core was obviously "lossy," whereas after vibration for one hour (FIG. 5) its behavior resembled an ideal inductor. The same core after only 30 minutes of vibration exhibited hysteresis but the loop was considerably narrower than that in FIG. 4.

Figure 6:
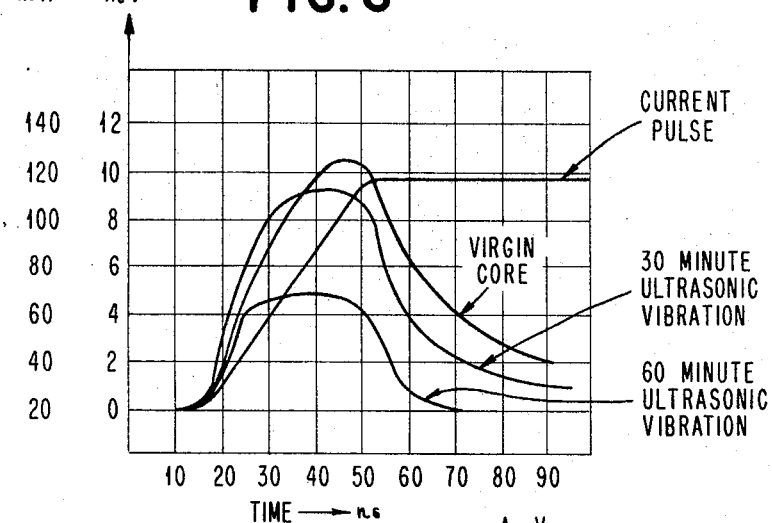
FIG. 6 illustrates effects of different durations of ultrasonic vibration on induced voltage response of cores (in millivolts) to the illustrated drive current (measured in milliamperes). The horizontal axis in the figure is 10 manoseconds per subdivision. The vertical axis is 2 millivolts per subdivision in voltage response and 20 milliamperes per subdivision in drive current.

FIG. 6 illustrates responses to a current pulse of the representative core from which the observations of FIGS. 4 and 5 were obtained, after respective vibration treatment intervals of 0, 30 and 60 minutes. It is seen that voltage output decreases progressively and tends to assume more uniform rectangular shape ideally approaching the time derivative $(di/dt)$ of the stepped drive current input as the treatment progresses in time.

Figure 7:
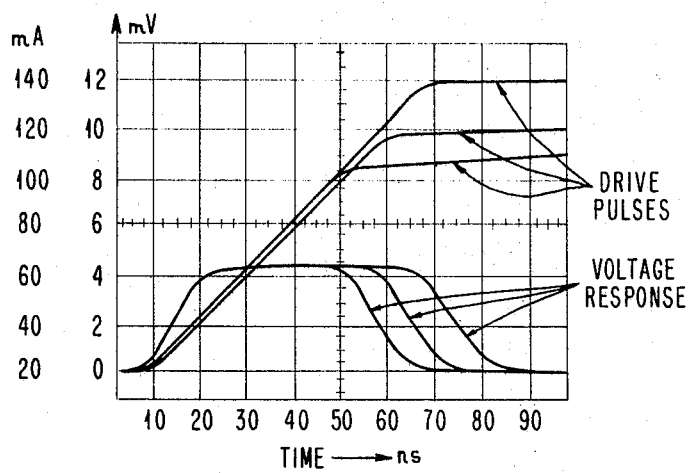
FIG. 7 illustrates the induced voltage response of a treated core to three drive current impulses of varying amplitude with identical rise slopes $(di/dt)$.

In FIG. 7 it is seen that the response of the core treated for one hour to three stepped drive input pulses with equal rise slopes and differing amplitudes, consistently conforms to the mathematical derivative $(di/dt)$ of the input as would be expected for an ideal inductor.

It has been shown therefore that by abrasively vibrating linear ferrite cores in a slurry of alcohol and fine abrasive aluminum oxide particles the linear response properties of the cores are improved in a single highly effective operation. Core losses almost disappear and the core response begins to resemble that of an ideal inductor. When the time of vibration is controlled according to the method explained with reference to FIG. 8 the voltage responses Vr of cores which have been sintered in batches are brought into a specific applicational range; in the present instance 7.5–10.0 millivolts. Other beneficial effects are the reduction in magnetostrictive ringing effects, and the stabilization of response, in terms of total flux induced in response to a known current pulse, over the temperature range −55° C. to +105° C.

We have ascertained experimentally using other vibration equipment that other vibration frequencies in the ultrasonic range tend to produce improvements in the linearity of core response equivalent to those noted above, after a time of vibration on the order of one hour, whereas in the lower audio frequency range the improvement effects become increasingly less noticeable and require increasingly greater intervals of core treatment before they are even observable.

We have also ascertained experimentally that other linear ferrite materials besides the nickel-zinc ferrite cores described above are subject to improvement in response properties by abrasive vibration treatment. Such ferrite materials as manganese-zinc ferrite ($Mn_{0.8}Zn_{0.2}Fe_2O_4$) have been treated as above and found to exhibit more linear flux response after a time of vibration on the order of 30 minutes.

We have also ascertained that some of the effects observed by the above ultrasonic vibration treatment may in part be due to a breaking of surface or skin stresses established in the cores earlier in the process of manufacture. Thus we have found that gently rubbing individual virgin cores on fine emery cloth tends to constrict the B–H characteristic.

While it appears therefore that there is no completely consistent physical explanation for these effects a working hypothesis is offered to facilitate understanding of the present invention. If one assumes that abrasive ultrasonic vibration as detailed above causes increased strains throughout the crystal lattice structure of the core material much can be explained. The crystal normally exhibits anisotropic properties in regard to direction and ease of magnetization. Thus some crystals are resistant to magnetization in a given direction and others are not. If then we assume a general increase in stress anisotropy with ultrasonic vibration we would expect a general decrease in permability (induced flux) and vibration (as borne out by FIG. 1). We would also expecte reduced magnetic remanence as observed and therefore reduced magnetostrictive ringing when excitation is removed from a treated core (note FIG. 3).

We have shown and described above the fundamental novel features of the invention as applied to a preferred embodiment. It will be understood that various omissions, substitutions and changes in form and detail, of the invention as described herein, may be made by those skilled in the art without departing from the true spirit and scope of the invention. It is the intention therefore to be limited only by the scope of the following claims.

We claim:
1. In the process of mass producing ferrite magnetic cores with substantially linear characteristics, which includes a batch sintering step, the additional process step— for enhancing the core response properties of linearity, temperature stability, and reduced magnetostrictive ringing of each batch with enhanced uniformity from batch to batch—of: subjecting cores of a sintered batch simultaneously to sustained mechanical agitation at an ultrasonic frequency, in a medium in which the cores are permitted to abrasively collide with each other at random, for an interval of time bearing a predetermined relationship to both the value of a common magnetic property of the cores of the batch ascertained from measurements made on a sampling of the cores prior to applying the said agitation and a desirable value of said magnetic property.

2. In the process of claim 1 the utilization of an alcohol solution as the said medium in which the cores are agitated.

3. In the process of claim 2 the addition to said alcohol solution of abrasive aluminum oxide particles to enhance the agitation treatment.

4. The process of claim 3 wherein said suspension of abrasive particles is kept uniformly distributed in the medium during said agitation by stirring means, maintaining a constant circulation of the medium.

5. The process of claim 3 including additional steps of extracting the cores from the medium after the vibrational treatment with magnetic means, and drying and cleaning the cores by holding the cores on a screen and passing air over and through the screen.

6. The process, for mass treatment of a batch of linear nickel-zinc ferrite cores pressed from a common powder preparation and sintered together in a batch sintering operation, which process tends to improve the quality of pulse transfer response properties of the cores in regard to linearity, temperature stability, and reduced magnetostrictive ringing, whereby the cores tend to assume properties of ideal inductors, including the steps of:

measuring the average induced peak voltage response $V_r$, to a drive current pulse, of a random sampling of a small number of cores in said batch;

determining a vibration time interval for said batch utilizing a known empirically determined relationship between present response and batch vibration time needed for a predetermined reduction in response with accompanying improvement in said properties;

placing said batch of cores in a solution of alcohol containing a suspension of finely subdivided abrasive aluminum oxide particles smaller in size than the inner diameters of said cores;

placing the container holding the cores and alcohol-aluminum oxide suspension into an ultrasonic vibrator tank;

vibrating the said container and its contents for the aforementioned vibration time interval;

removing the batch of cores from the said container using magnetic means and depositing the said cores onto a screen; and drying said cores by passing air over the cores and through the screen to remove all traces of alcohol and aluminum oxide abrasive which may have adhered to the cores during said vibration.

7. In the process of mass producing nickel-zinc ferrite magnetic cores, by sintering the cores in batches, the additional treatment steps of:

vibrating the cores of each said sintered batch together at an ultrasonic frequency, while the batch is suspended in a liquid medium containing a dispersion of fine abrasive particles, for a time interval determined separately for each batch as a function of both an average signal response property of the batch prior to vibrating and a desired final signal response property of all batches; and drying and cleaning the cores after vibration to separate the cores fully from the liquid medium and the abrasive particles dispersed therein.

8. The process of claim 7 wherein the cores treated have the approximate composition:

| | Mol percent |
|---|---|
| $Fe_2O_3$ | 49 |
| NiO | 18 |
| ZnO | 33 | the number of cores in a said batch is in the neighborhood of 50,000 cores;

the signal response property statistically representative of the batch is determined by first measuring the average peak voltage induced in a small random sampling of approximately 35 cores in response to drive current excitation of predetermined form and magnitude applied through predetermined coupling to each sample core, and then using an average peak voltage-batch vibration time relationship empirically determined from earlier treatments of cores, selecting a time of vibration for the batch;

the abrasive particles consist of aluminum oxide;

the liquid medium is alcohol;

the frequency of vibration is 40,000 kilocycles, and;

the drying and cleaning of said cores is performed by transferring the vibrated cores to a screen with magnetic means and blowing air over the cores and through the screen to remove all traces of alcohol and aluminum oxide which may have adhered to the cores.

9. The process of claim 8 wherein:

the said batch sintering process is controlled in time and temperature to provide a greater than desired average peak voltage which is reduced to a desired value within a predetermined range by said step of vibrating.

10. In the process of mass producing ferrite magnetic cores with desired response properties of linearity, temperature stability and reduced magnetostrictive ringing, the steps of:

sintering a batch of said cores under conditions of time and temperature designed to produce cores having peak voltage responses exceeding a given peak voltage which represents the upper bound of a range of voltages associated with a particular intended application of use of said cores; and ultrasonically vibrating said batch of sintered cores in an abrasive medium for a period of time established as a function of the difference between the average peak voltage of the batch prior to vibrating and said given peak voltage.

References Cited

UNITED STATES PATENTS

| 2,999,215 | 9/1961 | Lufcy et al. | 29—609 X |
| 3,116,106 | 12/1963 | McNees et al. | 51—313 X |
| 3,247,572 | 4/1966 | Munk | 29—604 X |

JOHN F. CAMPBELL, Primary Examiner

C. E. HALL, Assistant Examiner

U.S. Cl. X.R.

29—608; 51—313; 252—62.62; 264—67; 340—174